9076X

J. Lombard,

Washing Machine,

Patented Sep. 9, 1835.

James Lombard of Readfield State of Maine
Letters Patent

The schedule referred to in these Letters Patent and making
part of the same, containing a description in the words of the
said James Lombard himself of his improvement in a Machine
for washing.

Figure 3:
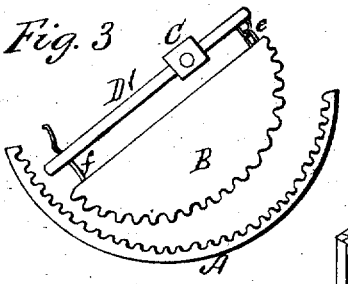
Figure 2:
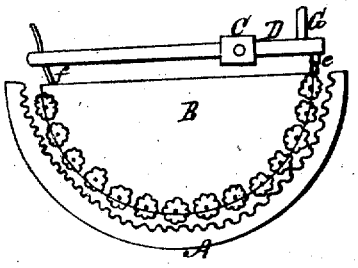
Figure 1:
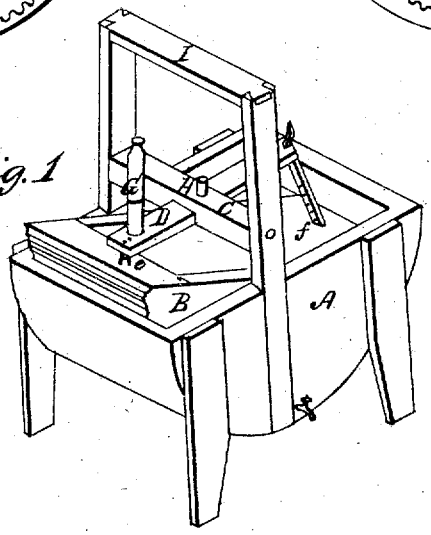

To all to whom these presents shall come,
Be it known that I James Lombard of Readfield in the County of
Kennebec & State of Maine (Physician have invented a new
and useful improvement in the machine for Washing and that
the following is a full and exact description of the construction
and operation of said machine as invented or improved by me
Reference being had to the accompanying plate. Fig 1, Is a repre
sentation of the machine as in action, A, is a tub or cistern upon
legs, made of any required size the bottom of this cisterns
is circular and inside it is covered with a fluted flooring
This cistern may be covered with a lid if necessary, B,
Is an interior cistern or semicylinder suspended within
the outer cistern A. having its circumference covered with
fluted boards or with fluted rollers as hereafter described
This interior cistern constitutes the rubber and is made
with two side pieces over which is bent a board fluted, across
the top are put strips of boards to strengthen it, This makes it hol-
low and renders it convenient to put dirty or other clothes while
not undergoing washing or weights may be put in to give power
or momentum to it, This rubber (B.) is suspended to a piece
of scantling or wooden rod or board D. by a hinge or snipe
bill at E, and by a strap chain or string at C. This pas
ses up thro' the end of D. and can be lengthened or shortened
at pleasure accordingly as you wish the rubber to press harder or less against the bottom of A. The piece D. passes thro a cross
piece C, which is placed in the frame work I. by gudgeons
at each end and the piece D, can be pushed backward and for
ward. thro it and confined in its place by a pin H. This
enables you to suspend the inner cistern or rubber B. more or
less from the centre and modify its pressure and action upon
the clothes. On one end of D. is fastened an upright rod G.
for the purpose of taking hold when operating the machine or
a crank may be attached to one of the gudgeons of C, Fig.
2, Is a section of the machine having fluted rollers in the
rubber, A is the cistern, B, the rubber, D the rod to which
it is attached E, the hinge F, the strap. C, the cross piece, thro
which D. passes G. the handle or lever, Fig 3. is also a section
having the Rubber canted up, in order to show its action,
Operation, nothing more is necessary after putting in the re
quisite quantity of water and Clothes, than to apply the hand
to the handle, or lever G, & pushes it back and forth,
Claims, I claim the general arrangement of the parts con
stituting the machine as above described and more particularly.
1. My form and application of the rubber or Interior cylinder as
above described, 2, my mode of suspending and operating my
rubber, as above described being made either with a fluted flooring
or with fluted rollers, 3: The application & use of the strap or
chain at the end of the rubber, F, whereby the pressure is regu
-lated & also the rubber allowed to yield or be liberated
when clogged or there is too much pressure;
In testimony that the above is a true specification
of my said improvement as above described I have hereunto set
my name this 22d. day of July A.D, 1835
Witnesses
Ezekiel Holmes
Saml. B. Benson
Daniel Lombard
708 [illegible]

(Drawing)

E.? [illegible]